United States Patent [19]
Roderfeld et al.

[11] Patent Number: 5,339,611
[45] Date of Patent: Aug. 23, 1994

[54] TANDEM RUNNING GEAR ON A SELF-PROPELLED AGRICULTURAL MACHINE

[75] Inventors: Heinrich Roderfeld; Franz Heidjann, both of Harsewinkel; Norbert Diekhans, Gutersloh; Willi Behnke, Steinhagen, all of Fed. Rep. of Germany

[73] Assignee: Claas oHG, Harsewinkel, Fed. Rep. of Germany

[21] Appl. No.: 923,428

[22] Filed: Aug. 3, 1992

[30] Foreign Application Priority Data

Aug. 2, 1991 [DE] Fed. Rep. of Germany ....... 4125603

[51] Int. Cl.⁵ .................... A01D 75/28; B62D 61/10
[52] U.S. Cl. ................. 56/10.2; 56/DIG. 15; 180/24.02; 180/209
[58] Field of Search ............. 180/24.02, 209; 56/10.2, DIG. 15

[56] References Cited

U.S. PATENT DOCUMENTS

| | | | |
|---|---|---|---|
| 3,740,070 | 6/1973 | Butler et al. | 180/24.02 X |
| 3,831,693 | 8/1974 | King | 180/24.02 X |
| 4,056,158 | 11/1977 | Ross | 180/24.02 X |
| 4,462,477 | 7/1984 | Mastro | 180/24.02 |
| 4,789,038 | 12/1988 | Nguyen et al. | 180/209 X |
| 4,842,302 | 6/1989 | Lauronen et al. | 180/24.02 X |

Primary Examiner—Timothy V. Eley
Attorney, Agent, or Firm—Browdy and Neimark

[57] ABSTRACT

A tandem running gear on a self-propelled agricultural machine, in particular a combine, where in the front a drive axle (1) and on both sides thereof swing arms (3, 3A) are disposed under the chassis (2). The swing arms (3, 3A) can be charged by hydraulic work cylinders (8, 8A) in such a way that a respectively preset wheel load distribution between the drive wheels (5, 5A; 6, 6A) and the steered wheels (7, 7A) is attained using a measuring and control device for the hydraulic device.

13 Claims, 4 Drawing Sheets

TANDEM RUNNING GEAR ON A SELF-PROPELLED AGRICULTURAL MACHINE

FIELD OF INVENTION

The invention relates to a running gear for a self-propelled agricultural machine, in particular for a combine, with a rear steering axle with two wheels and with a front tandem running gear with one axle supporting a swing arm on each end, on each of which two drive wheels are seated disposed behind each other and on which a double-acting hydraulic work cylinder acts in a hinged manner, which acts with its other end on the combine chassis in a hinged manner, so that by means of this arrangement the swing arm can be pivoted in a controlled manner.

BACKGROUND

Such a general running gear has been previously described in East German Letters Patent DD-PS 84 511. The disposition of a tandem running gear on a combine has the advantage that the permissible structure width, which is determined by the road traffic regulations, can be used to a great extent for the threshing and sifting device, because the drive wheels located behind each other require less lateral space than dual wheels, but offer the same amount of contact surface with the ground. Furthermore, an increase in the contact surface can be attained by providing the pairs of wheels with track chains, which is advantageous in wet areas, for example in rice fields.

It had been proposed to dispose the swing arm of the tandem drive in a freely movable manner when in the fields by giving the hydraulic lift cylinder a by-pass or short circuit control between its lift chambers. For road travel it was intended to pivot the tandem arm by means of the hydraulic work cylinder in such a way that only the front pair of wheels or the middle pair of wheels had contact with the ground. The wheel drive for the two pairs of drive wheels was provided via drive chains from the tandem axle or via individual hydraulic drive motors. In this way it was possible for all wheels to make a contribution to forward movement corresponding to their ground contact. In the over-the-road position it was proposed to disconnect the free wheel pair from the drive. The incomplete use of the structure width between the two tandem wheels was disadvantageous, because in addition to the wheels, the tandem arm was also disposed on the side of the combine chassis. Another disadvantage was the lack of regulation of the wheel loads.

A combine is also known from German Utility Model DE-GM 71 01 995, the drive wheels of which were disposed on the front in a tandem arrangement. It was provided here that only one pair of wheels of the tandem wheels was directly driven. The drive between the pairs of wheels was provided by a track chain running around them.

SUMMARY OF INVENTION

It is an object of the invention to provide a vehicle with a tandem running gear, which has improved driving properties and which permits an increased use of the set structural width.

This object is attained in accordance with the invention by disposing at least two measurement value transmitters on the tandem running gear, by means of which a control device determines the appropriate wheel loads on the drive wheels directly or indirectly and compares them in the form of actual values with respectively predetermined set values and accordingly issues control signals, which act in a regulating way, to at least one multi-way control valve for charging the work cylinders.

It is provided in a particularly advantageous manner that the tandem arms are disposed underneath the combine chassis and only a small free space is provided between the drive wheels and the chassis. In a special embodiment, the two tandem wheels, located behind the other, are provided with tires of different width, so that the wheels at the front have a greater width, because they are located next to the somewhat narrower inclined conveyor, and each of the back wheels is made somewhat narrower in order to make as large a chassis width as possible available, which is used for housing threshing and sifting means.

In connection with the opportunity of controlling the distribution of the wheel loads between the front and back wheel there is provided the novel option of wheels of different embodiments each producing optimum use of its adhesion coefficients.

In addition, the control of the load distribution on the two pairs of wheels disposed behind each other results in an advantageous ground load, which leads to decreased total packing of loose soil, in that the leading wheel produces a decreased ground load and thus a first prepacking of the soil, and the trailing wheel produces optimum adhesion to this pre-packed soil while only sinking in a little. Such conditions preserve the soil and save driving output and energy; swampy soil in particular, on which rice is planted for example, become passable.

Measurement of the load distribution can be performed in a particularly advantageous manner via hydraulic pressure sensors on the chambers of the work cylinders. In the course of this measurement the differential pressure signal between the two chambers is detected, for which preferably the connection to the hydraulic supply is shut off to obtain definite measured values. In place of individual pressure sensors it is possible to use differential pressure sensors which directly provide the desired measurement signal which signals the respective piston load. It is possible to carry out a controlled driving operation directly on the basis of the pressure measurement signals obtained, in which a preset load ratio between the pairs of wheels is maintained as long as the basic data of the load are known. With fully advanced control of the hydraulic cylinders, these basic data can be determined from the respective piston load, because then the total load is placed on one of the pairs of wheels and therefore the respective ground force component of the wheel placed on the bottom is determined on the basis of the lever arm conditions of the swing arm and from the directional component of the hydraulic force sensor perpendicularly to the lever arm.

A further advantageous type of operation results from the control, because the load on the steered wheels can be changed within a wide range in that by means of a suitable setting of the work cylinder the load is displaced mainly on the front or back tandem wheels. This is particularly important because the total weight of a combine and the location of its center of gravity results from the respective weight of the front cutter assembly as well as from the respective degree of fill of the grain tank with harvested material.

In an advantageous manner it is possible to determine the respective proportion of weight of the harvested material in that sequentially a determination of the axle load on the two pairs of tandem wheels is made by sequentially controlling the one or the other pair of drive wheels in the lifted position, after which the pressure determination in the cylinder chambers takes place.

Simplification of the axle load determination at the steering axle and a determination of the load distribution between the two drive wheels is made possible in that a force sensor is disposed on the tandem axle and/or the steering axle, the signal of which directly provides the measured data to the control device, so that a continuous weight determination of the harvested material and a continuous load distribution control can take place because of which steering is always guaranteed.

Furthermore, an advantageous embodiment of the control device makes it possible that the load distribution on the two tandem arms is separately controllable. By means of this the level placement of the combine chassis is possible within certain limits during inclined driving on a hill, in that the respective downhill pair of wheels is greatly pivoted and the uphill pair of wheels is set to be freely swinging. This level placement results in improved threshing and sorting because of an even material distribution over the entire width of the machine. This type of control can be used in combination with or as replacement for the known pivoting devices of the threshing and sorting implements in the chassis. The ground pressure sensors at the front mowing system which are used in the customary manner for pivoting are also to be used for providing the preset data for position control.

It is a further advantage that the hydraulic control device is provided with a damping unit which additionally switches on damping means for the chanters of the hydraulic work cylinder as a function of occurring pressure signal changes. This produces damping of vibrations and protection of the vehicle, particularly when driving over rolling ground. An increase in the formation of rolling ground is also prevented by this arrangement.

Advantageously the control device is program-controlled and provided with a signal connection, for example a standardized CAN[1]-bus, to a central control computer in the cab, from which the appropriate data for the operational modes are taken and to which the appropriate operational data, measurement results and the determined weight of the harvested material are transferred, so that the operator can be provided with comprehensive information. For reasons of operational technology it is also provided that direct control of the control valves of the work cylinder by the operator can take place, so that the most important functions can also be produced in an auxiliary way.

[1] Controller Area Network

BRIEF DESCRIPTION OF DRAWING

Advantageous embodiments of the device are illustrated in FIGS. 1 to 6.

DETAILED DESCRIPTION OF EMBODIMENTS

Figure 1:
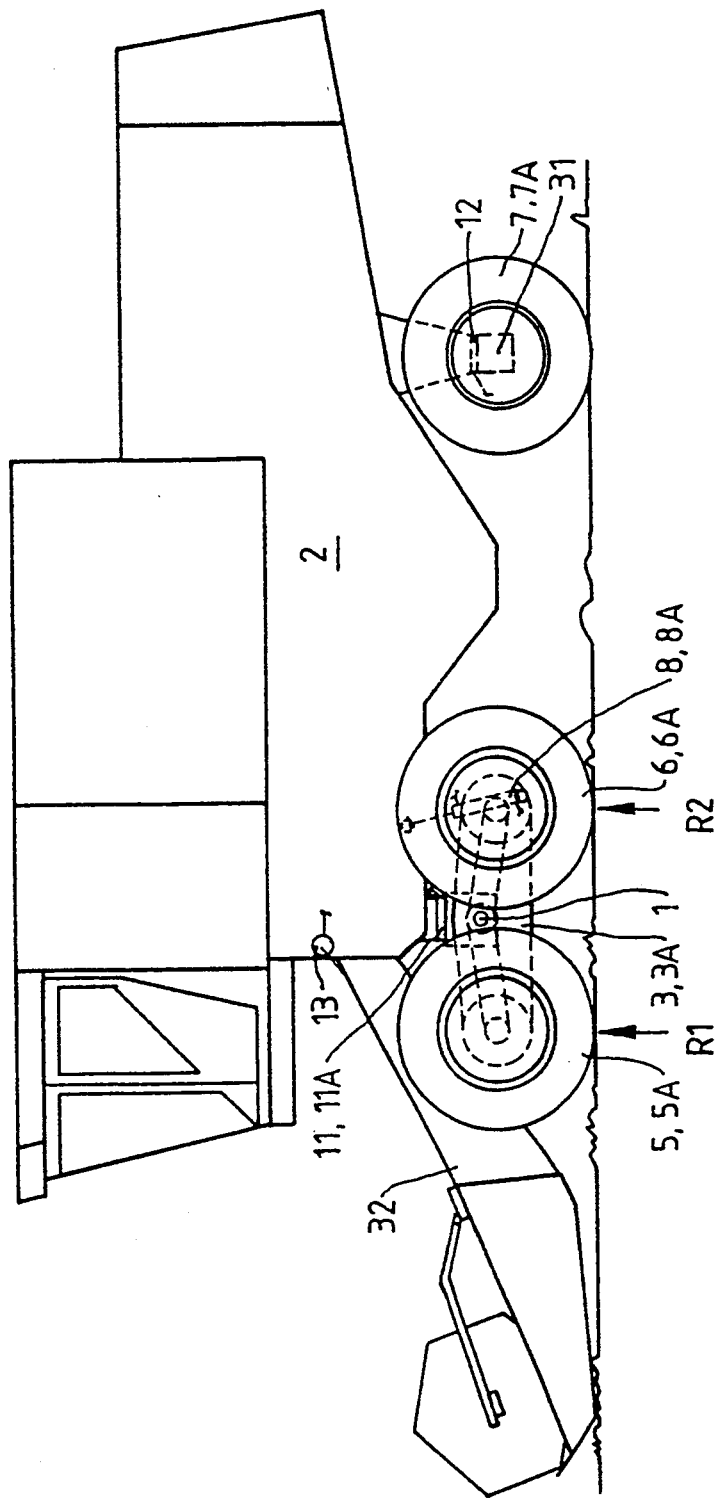
FIG. 1 is a lateral view of a combine with tandem drive according to a first embodiment.

FIG. 1 is a lateral view of a combine, on the front of the chassis (2) of which a cutter system with an inclined conveyor (32) is disposed, and under the front of which a drive axle (1) is seated. On each of both sides of the drive axle (1) there is disposed a tandem arm or swing arm (3, 3A) which supports on its front a drive wheel pair (5, 5A) and on the back a further drive wheel pair (6, 6A). A steering axle (31) with steered wheels (7, 7A) is disposed under the chassis (2) at the back. The addition of the letter "A" to the numbers of the reference numerals has been used throughout for indicating the device elements on the right side invisible in FIGS. 1–3 of the drawings. The swing arm (3, 3A) is pivotably connected with the chassis (2) via respective hydraulic, double-acting work cylinders (8, 8A).

Axle load sensors (11, 11A, 12) are disposed in the bearing points of the axles (1, 31), by means of which the respective load on the tandem arms (3, 3A) or the steering axle (31) is detected, which is supplied to a control device. An angle sensor (13) is located on the inclined conveyor (13) and indicates whether the conveyor is in the lowered operating position or in a raised position, for example for road travel.

Figure 2:
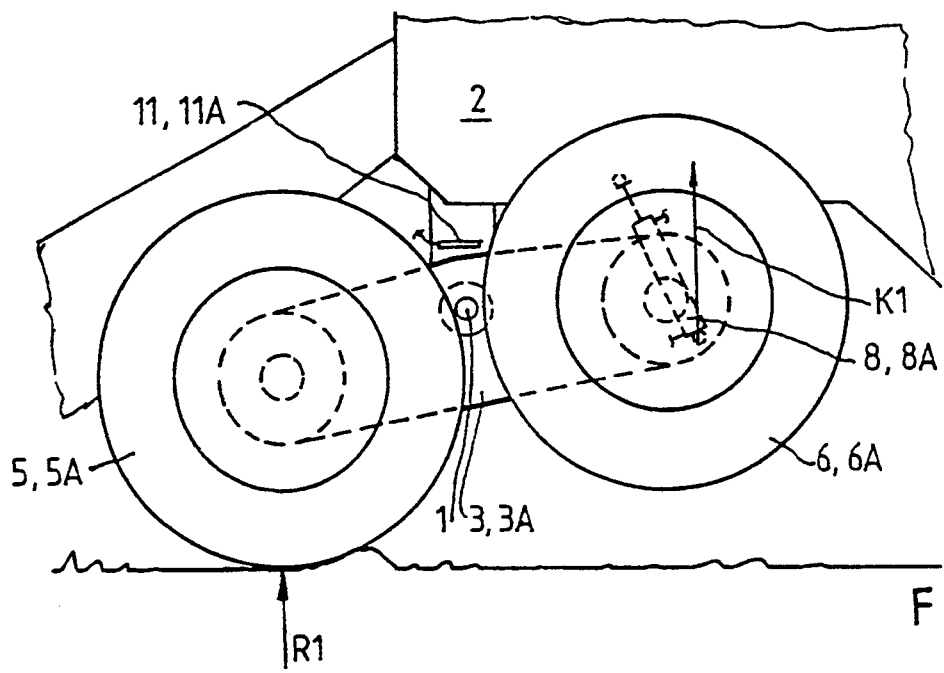
FIG. 2 shows the tandem drive with the rear wheels raised.

FIG. 2 shows the tandem running gear with the rear wheels (6, 6A) raised, because the work cylinder (8, 8A) has been charged on the piston rod side. The entire frontal load of the combine therefore rests on the other drive wheel pair (5, 5A). The ground pressure (R1) on this wheel is transferred by the swing arm in accordance with its lever arms as a vertical component (K1) to the cylinder force in the work cylinder (8, 8A). Besides the force transfer at the piston rod hinge point, there is a load transfer to the chassis (2) by means of the support on the drive axle (1).

Figure 3:
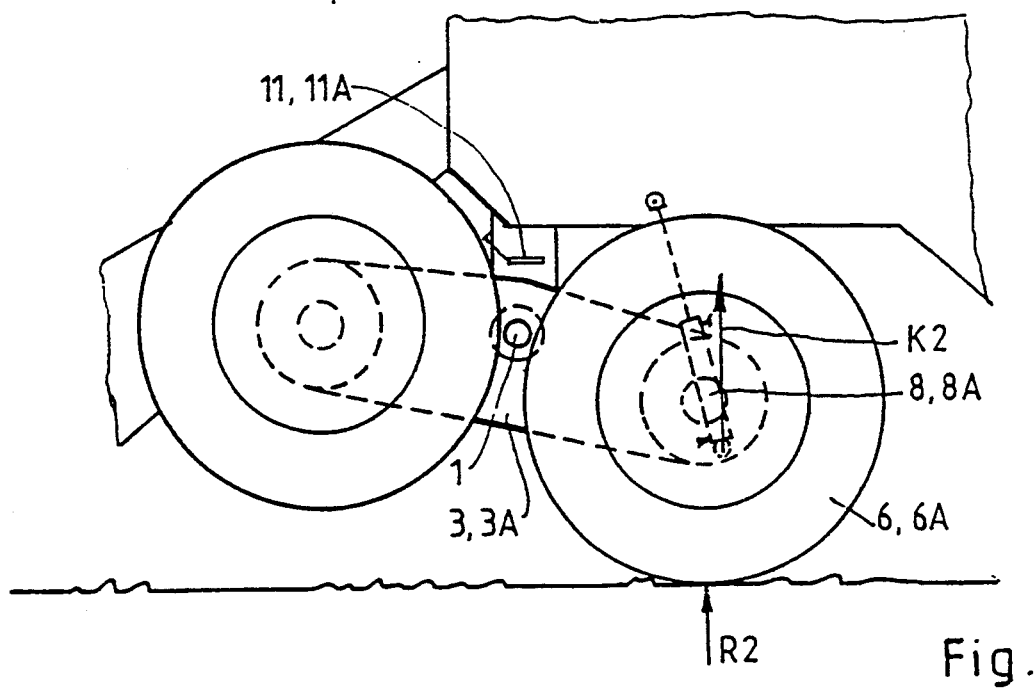
FIG. 3 shows the tandem drive with the front wheels raised.

FIG. 3 shows the tandem arm (3, 3A) in a further pivoted position, where the work cylinder (8, 8A) is charged on the piston side and the piston rod is far extended, so that only the rear pair of wheels (6, 6A) has ground contact. The ground pressure force (R2) is transferred in accordance with the lever conditions on the swing arm as the vertical component (K2) of the force of the work cylinder (8, 8A). Accordingly, the support forces of the arm (3, 3A) are transferred to the chassis via the drive axle (1) with the force sensor (11, 11A), as well as substantially via the hinge point of the hydraulic piston.

Because the distance of the drive wheels (5, 5A, 6, 6A) from the steered wheels (7, 7A) is different in accordance with FIG. 3 it is possible to determine the position of the respectively occurring center of gravity as well as the amount of weight increase of the combine during filling of the grain reservoir from the measured values of the piston forces (K1, K2) and the correspondingly different lengths of the lever arms.

Figure 4:
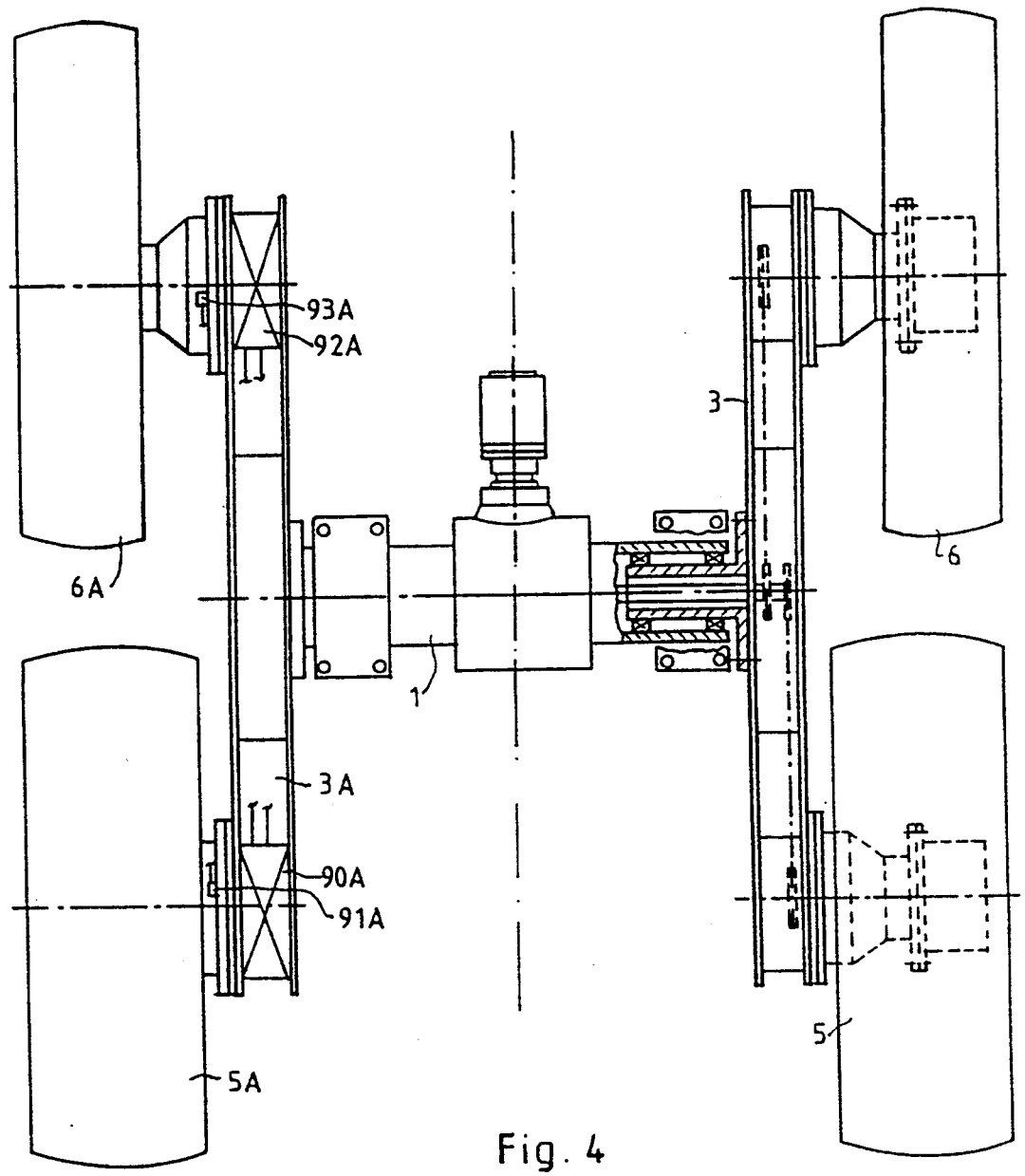
FIG. 4 shows a disassembled tandem running gear in a top view, partially opened; the left half of the illustration shows hydraulic drives, the right half chain drives.

FIG. 4 is a top view of a disassembled tandem running gear, the axle (1) of which, as well a tandem arms (3, 3A), are disposed under the chassis, the machine being oriented with its front end at the bottom of FIG. 4. The wheel bearings of the wheels (5, 5A, 6, 6A)

extend laterally out from the tandem arm. It has been furthermore provided that the wheels (6, 6A) located next to the chassis are narrower than the front wheels (5, 5A) disposed next to the inclined conveyor. In this manner the optimum width of the space for the housing has been maintained. The two wheels (5, 6; 5A, 6A) are each flush behind each other on the outside, so that the permissible vehicle width is fully used.

On the right side of FIG. 4, the arm (3) of a first embodiment is shown open, so that the chain drives there are visible which drive each of the two wheels from the central drive axle (1).

On the left side of FIG. 4, the arm (3A) of a second embodiment with hydraulic drive of the individual wheels is shown. In this case each wheel (5A, 6A) has an individual hydraulic motor (90A, 92A), so that the full output of the motor is transferred to each wheel (5A, 6A). This independence of the wheels from each other also results in an increased rpm occurring at the wheel with the higher load, because it is pressed down harder and therefore has a smaller effective radius. For this reason means are provided to determine the load ratio at these wheels by the ratio of the rpm measured with the rpm sensors (91A, 93A) at the wheels (5A, 6A) and, correspondingly, on the other side of the vehicle, and to perform an adjustment in relation to a predetermined wheel load distribution.

The adjustment of the wheel load distribution is made in relation to a first, narrow tolerance range of the rpm ratios, where in each case the faster rotating wheel is relieved, so that by means of this action its effective radius is increased and its rpm is reduced accordingly.

Under particularly unfavorable conditions it is not possible by means of the above mentioned adjustment to prevent spinning of a wheel. For this reason it has been additionally provided that when a second, greater predetermined tolerance range of the rpm ratios is exceeded, an adjustment in the opposite way is performed, in that the wheel which rotates too fast is controlled by increasing the load, and thus spinning is prevented or stopped.

The hydraulic drive or a differential drive of each individual wheel offers the chance to stop the drive of the raised pair of wheels during road travel, by means of which for all practical purposes double the rpm are attained by the other pair of wheels, which produces faster road travel.

In an advantageous manner it is additionally possible for working in difficult terrain to apply dual wheels to the wheel hubs. This variation is particularly helpful if each of the wheel axles is raised during mounting, as shown in FIGS. 2 and 3. The conduit for the harvested material of the combine can be used in this case as a mounting aid.

Figure 5:
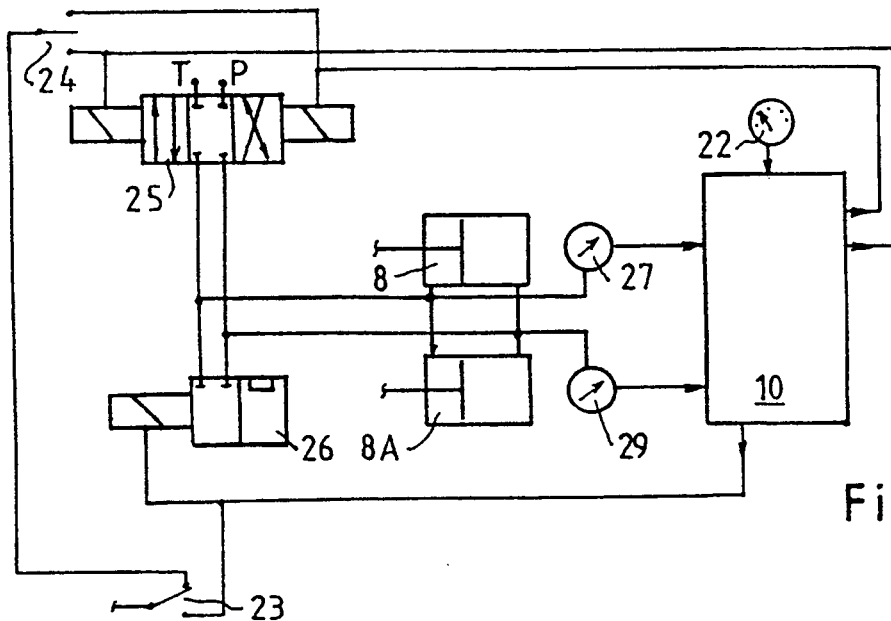
FIG. 5 shows a first embodiment of a hydraulic control device.

FIG. 5 schematically shows the hydraulic control device with the hydraulic work cylinders (8, 8A) and a reversing valve (25), which is reversible for parallel charging of the chamber of the work cylinders on the piston side or the piston rod side. In its normal position it is in a blocking position, in which each of the two chamber areas are blocked. The pressure conditions in the two chamber areas can be determined by pressure sensors (27, 29) in this position, which are connected to the input of a control device (10) o This control device selectively charges the two electromagnets of the reversing valve (25) as a function of control data, which are preset, particularly by means of a program selector (22). Furthermore, a control valve (26) is provided which in its normal position has no effect on the hydraulic control line, but in the switched-on state makes an hydraulic by-pass or short circuit linkage of the two hydraulic lines and thus of the two chamber areas of the work cylinders (8, 8A). In an auxiliary manner it is provided that the control signals of the valves (25, 26) are issued directly via a hand switch (23) or a changeover switch (24) which may be operated by a key, so that emergency service can be performed independently of the presence of the electronic control device (10). In this case it is possible to obtain free movement of the tandem arms by operating the switch (23) and lifting of the front or rear wheel pair, or a corresponding different load distribution on the two wheel pairs can be produced by operating the keyed changeover switch (24).

Figure 6:
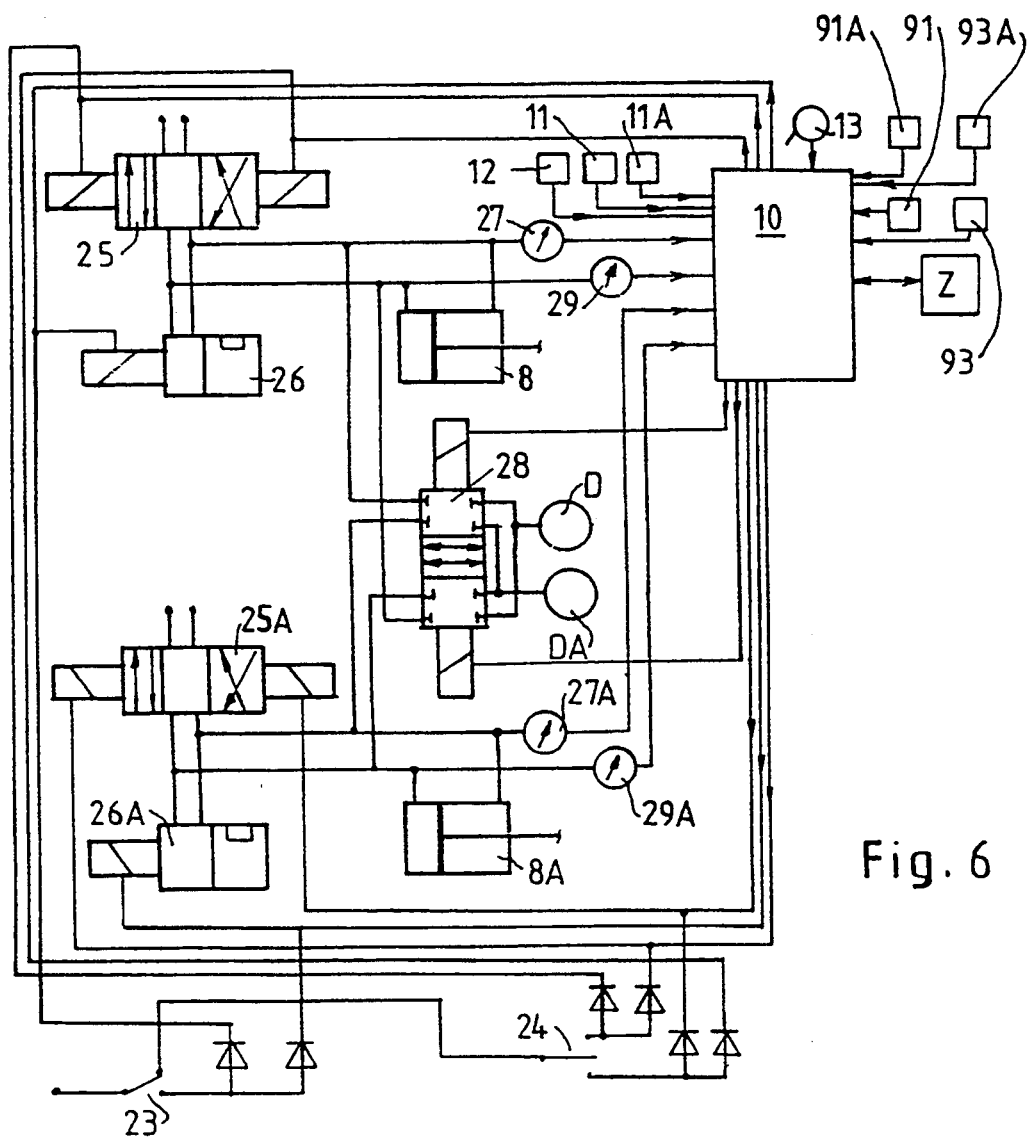
FIG. 6 shows a deluxe second embodiment hydraulic control device.

A further, complemented control circuit is shown in FIG. 6, which comprises additional sensors (11, 11A, 12) for axle load measurements and which has separate control valves (25, 25A, 26, 26A) for the two work cylinders (8, 8A). In addition, separate pressure sensors (27, 27A; 29, 29A) are provided in the two hydraulic areas, so that separate pressure measurements can be performed on the two arms and correspondingly separate axle load distributions can be controlled. This device has its advantage particularly if it is intended to compensate for inclined driving on a hill. In this case the control valve (26, 26A) which is related towards the hill side cylinder is short-circuiting it, i.e. the lowest position of the axle is brought about there, and on the side towards the valley the arm is adjusted by the control valve (25, 25A) so that the wheel is lifted. In this connection it is preferably provided that the wheel located at the back is pushed downward, because by means of this a particularly advantageous load distribution can be attained also to the two steered wheels.

It is furthermore provided to connect the respective pressure lines on the piston side or the two pressure lines on the piston rod side with gas pressure reservoirs (D, DA) in a controlled manner by means of a reversing valve (28). Operation of the valve for making the connection with one or the other pair of chambers takes place as a function of such pressure conditions which signal a chassis swing, for example because of a rise or a depression in the ground. In this connection the two pressure reservoirs (D, DA) are connected to the hydraulic lines as dampers acting in opposition to the creation of an oscillation move.

With this circuit, too, manual operating means (23, 24) are provided, which supply the valve control magnets corresponding to each other via decoupling means, even if the control device (10) is not present. The angle sensor (13) of the inclined conveyor is also connected to the control device, so that the operational readiness of the mower system can be ascertained. The control device is connected via a signal bus (CAN) with a central unit (Z) which transmits control data and receives measurement values and processes them further.

FIG. 6 also shows the rpm sensors (91, 91A, 93, 93A) which are provided in the embodiment having individually driven wheels. Because rpm sensors are very inexpensive and their pulse signals can be directly digitally processed, they represent an economical alternative to the axle load and/or pressure meters. However, they can also be used redundantly, i.e. as additional elements.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

What is claimed is:

1. In a running gear of a self-propelled agricultural machine having a chassis (2), with a rear steering axle (31) with two wheels (7, 7A) and with a front tandem running gear with a drive axle (1) pivotally supporting a swing arm (3, 3A) on each end, each swing arm carrying two drive wheels (5, 6; 5A, 6A) one disposed behind another, a double-acting hydraulic work cylinder (8, 8A) connected between each said swing arm and said chassis (2), so that by means of said cylinder the swing arm (3, 3A) can be pivoted in a controlled manner, the improvement comprising, at least two measurement value transmitters (27, 27A; 29, 29A; 11, 11A; 91, 91A; 93, 93A) disposed on the tandem running gear (1, 3, 5, 6), and control means (10) for receiving values from said value transmitters and determining appropriate drive wheel load values (R1, R2) on the drive wheels (5, 6; 5A, 6A) directly or indirectly and comparing said load values with respectively predetermined set values and outputting control signals, which act in a regulating way, to at least one multi-way control valve (25, 25A) for charging each said work cylinder (3, 8A).

2. A running gear in accordance with claim 1, wherein a first of said at least two measurement value transmitters are pressure sensors (27, 27A; 29, 29A) disposed on each said swing arm (3, 3A) in two pressure lines respectively engaged to each said work cylinder (8, 8A), a differential pressure signal of said pressure sensors (27, 27A; 29, 29A) of each said work cylinder (8, 8A) being evaluated with the pressure lines controlled closed as a corresponding work cylinder (8, 8A) pressure measurement value, and a second of said at least two measurement value transmitters are at least one wheel load or drive axle sensor (11, 11A) of the drive axle (1), and a third of said at least two measurement value transmitters are rpm measurement sensors (91, 91A; 93, 93A) of the drive wheels (5, 5A; 6, 6A), which are driven independently of each other via differential drives or hydraulically, and from a ratio of the measured rpm of the wheels (5, 5A; 6, 6A) of one of the swing arms (3, 3A) the respective effective wheel radius changes are determined in accordance with which the wheel load conditions are determined.

3. A running gear in accordance with claim 2, wherein one of several modes of operation is preset in the control means (10), where n a first mode of operation the control means only connects the respectively two chambers of the work cylinders (8, 8A) in a short-circuited manner with each other via a first control valve (26, 26A), and in a second mode of operation the control means, repeatedly provides the respectively one of the chambers of the work cylinders (8, 8A), by operating the control valves (25, 25A) for a short time, with pressure until essentially no increase in the pressure value can be detected, because one of the drive wheel pairs (5, 5A; 6, 6A) no longer receives a load and is free, and in a third mode of operation, the control means provides the chambers of the work cylinders (8, 8A) by operating the control valves (25, 25A), with pressure, if the actual pressure measurement value in a chamber has fallen below a preset pressure measurement value, so that a respectively preset load distribution of the drive wheels (5, 6; 5A, 6A) is kept within a tolerance range.

4. A running gear in accordance with claim 3, characterized in that in a fourth mode of operation, the control means (10) respectively compares the pressure sensor signals of chambers of the two work cylinders (8, 8A) charged in the same direction with each other and, when the difference in their pressure measurement value exceeds a preset tolerance range, operates the control valves (25, 25A) briefly in such a way, that the chamber with the respectively higher pressure measurement value is charged with pressure, and briefly operates that control valve (25, 25A) which relieves the chamber with the lower pressure, or operates that control valve (26, 26A), which short-circuits this chamber with the other chamber of the same work cylinder (8, 8A).

5. A running gear in accordance with claim 3, wherein on the basis of a preset signal the control means (10) operates in a damping operation mode, where the control means (10) places a damping control valve (28) into a position in which respectively one gas pressure buffer (D, DA) is connected on the pressure side with one of the chambers of the work cylinder (8, 8A).

6. A running gear in accordance with claim 3, characterized in that in the harvesting operation mode the load distribution of the drive wheels (5, 5A; 6, 6A) is preset in such a way that the front wheels (5, 5A) take up a reduced wheel load, and that the control means (10) charges or relieves the work cylinders (8, 8A) by brief activation of the control valve at such time, when the pressure measurement value of the chamber, which is stressed by pressure, of the work cylinder (8, 8A) in relation to the drive axle load signals of the axle load sensors (11, 11A), exceeds a preset tolerance value on the high or the low side.

7. A running gear in accordance with claim 2, wherein the control means (10), utilizing a brief actuation of the control valves (25, 25A), respectively charges the work cylinders (8, 8A) in such a way that the respectively associated faster rotating wheels (5, 6; 5A, 6A) are relieved when the ratio of the measured rpm of the drive wheels (5, 5A; 6, 6A) is exceeding a preset first tolerance range, and are loaded, when the named ratio has fallen below first tolerance range, and that each time when the named ratio is exceeding or has fallen below a longer-lasting actuation of the control valves (25, 25A) in the opposite direction takes place, by means of which spinning is counteracted.

8. A running gear in accordance with claim 1, wherein at least one angle sensor (13) is disposed on a front harvest material conveyor (32), which signals the respectively raised or lowered position to the control means (10), and that in the raised position in a weighing operation mode in a first step the control valves (25, 25A) charge the work cylinders (8, 8A) on respectively one chamber side until the pressure measurement value is essentially constant because one drive wheel pair (5, 5A; 6, 6A) has been raised, whereupon a first pressure measurement value is stored, and in a second step the work cylinders (8, 8A) on the respectively other chamber side are charged until the other drive wheel pair (5, 5A; 6, 6A) is raised, whereupon a second pressure measurement value is stored, and that then a total weight is calculated, stored and output from the stored pressure measurement values in accordance with their vertical load components (K1, K2) and the associated load lever arms of the swing arms (3, 3A) and the axle distance of the steering and drive axles (31, 1), and that possibly a previously stored initial total weight is subtracted therefrom and a harvest weight, calculated in this manner, is stored and output.

9. A running gear in accordance with claim 1, characterized in that when a raised position of a harvest material conveyor (32) is signaled to the control means (10) and when a weighing operation mode has been preset, the control means (10) adds up a respectively total weight from a steering axle load value and the vertical force component values (K1, K2) of drive wheel load values, stores and outputs said total weigh and said vertical force component valves and subtracts a possibly previously calculated initial total weight and stores and outputs a total harvest weight calculated in this manner.

10. A running gear in accordance with claim 1, wherein the control valve (26, 26A; 25, 25A) can be brought into respectively one or another position directly by a control switch (23, 24).

11. A running gear in accordance with claim 1, wherein the drive axle (1) and the swing arms (3, 3A) are disposed under the chassis (2).

12. A running gear in accordance with claim 11, wherein the front drive wheels (5, 5A) are wider than the rear drive wheels (6, 6A) and the two drive wheels (5, 6; 5A, 6A) on each gear side are arranged coplanar with their respective outer faces.

13. A running gear in accordance with claim 1, wherein a steering axle load sensor (12) is disposed on the steering axle (31), the axle load value of which is put into a relationship with the sum of the drive axle load value and its vertical force component value (K1, K2) in accordance with the pressure measurement value, and that at a time when the formed ratio exceeds a preset tolerance value required for safe steering, the control valves (25, 25A) are briefly activated in such a way, that the work cylinders (8, 8A) are charged, so that either the rear pair of drive wheels (6, 6A) or the front pair of drive wheels (5, 5A) takes on a larger portion of the load, and that this load distribution is preset in the further control in the third mode of mode.

* * * * *